US009923937B2

(12) United States Patent
Jain et al.

(10) Patent No.: US 9,923,937 B2
(45) Date of Patent: Mar. 20, 2018

(54) DYNAMIC PERSONALIZED CONTENT PRESENTATION TO RE-ENGAGE USERS DURING ONLINE SESSIONS

(71) Applicant: Adobe Systems Incorporated, San Jose, CA (US)

(72) Inventors: Ajay Jain, Ghaziabad (IN); Sumeet Gupta, New Delhi (IN); Mili Sharma, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 284 days.

(21) Appl. No.: 14/714,614

(22) Filed: May 18, 2015

(65) Prior Publication Data
US 2016/0344779 A1 Nov. 24, 2016

(51) Int. Cl.
*H04L 29/06* (2006.01)
*H04L 29/08* (2006.01)
*G06Q 30/06* (2012.01)

(52) U.S. Cl.
CPC ............ *H04L 65/403* (2013.01); *H04L 67/02* (2013.01); *H04L 67/10* (2013.01); *H04L 67/145* (2013.01); *H04L 67/22* (2013.01); *H04L 67/26* (2013.01); *G06Q 30/0631* (2013.01)

(58) Field of Classification Search
CPC ... G06F 17/30867; H04L 67/33; H04L 67/02; G06Q 40/0631; G06Q 30/0269; G06N 99/005
See application file for complete search history.

(56) References Cited

U.S. PATENT DOCUMENTS

| 2003/0039948 A1* | 2/2003 | Donahue | G09B 7/02 434/322 |
| 2011/0208508 A1* | 8/2011 | Criddle | G09B 19/06 704/9 |
| 2014/0127656 A1* | 5/2014 | Healy | G09B 5/00 434/236 |
| 2015/0052075 A1* | 2/2015 | Jayadevan | G06Q 10/10 705/327 |

* cited by examiner

*Primary Examiner* — Chirag R Patel
(74) *Attorney, Agent, or Firm* — Wolfe-SBMC (57) ABSTRACT

Users can participate in various different types of online sessions, such as webinars, massive open online courses (MOOCs), social learning sessions, and so forth. A record of interactions that the user has with an online session is maintained. During the online session, the user may become disengaged from the online session for various reasons, such as the user losing interest in the information being presented, the user becoming sidetracked due to other programs running on his or her computer or phone, and so forth. The techniques discussed herein detect that a user is not engaged in the online session and generate dynamic content to attempt to re-engage the user in the online session. This dynamic content is personalized to the user, and is based on the maintained record of user interactions with the online session.

20 Claims, 5 Drawing Sheets

DYNAMIC PERSONALIZED CONTENT PRESENTATION TO RE-ENGAGE USERS DURING ONLINE SESSIONS

BACKGROUND

Users can participate in various different types of online sessions, such as webinars, massive open online courses (MOOCs), social learning sessions, and so forth. Various different information can be provided to users via these different types of online sessions. Unfortunately, situations can arise in which users become distracted during an online session due to lack of interest, other programs running on the user's computing device, and so forth. This can result in users not obtaining the information being made available during the online session, which can be detrimental to both the users and the provider of the online session.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a user of a computing device not being engaged in an online session is detected during the online session. Dynamic content personalized to the user based on multiple interactions the user previously had with the online session is generated, and the generated dynamic content is displayed or otherwise presented to attempt to re-engage the user in the online session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Dynamic personalized content presentation to re-engage users during online sessions is discussed herein. Users can participate in various different types of online sessions, which are presentations realized using electronic transmissions and receptions to facilitate two or more people communicating if they are not co-located within a single room. Examples of online sessions include webinars or web conferences, massive open online courses (MOOCs), social learning sessions, online meetings, teleconferences, video conferences, and so forth. Online sessions can be previously recorded presentations, or "live" presentations (e.g., presented as they occur, or with a short delay (e.g., less than fifteen seconds) after having occurred). An online session thus is a presentation in which multiple people communicate with each other, including unilateral communication (e.g., playback of a previously recorded webinar that a user just listens to or watches) and bilateral communication (e.g., a live webinar having a presenter and one or more additional users listening or watching as well as asking questions). The presentations can include various types of data, such as audio data, video data, image data, other types of data, and combinations thereof.

The user participation in an online session refers to the user providing and/or receiving (e.g., watching, listening to) content of the online session. Examples of user participation include the user viewing and/or listening to information being presented, the user speaking, sharing, or otherwise presenting information, the user typing or talking in chat sessions with other users, the user answering polls or quizzes regarding information that is presented, and so forth.

A record of interactions that the user has with the online session is maintained. These interactions refer to different inputs to the online session that the user may have, such as the user speaking or sharing different information, the user participating in a chat session with other users, the user answering polls or quizzes regarding information presented during the online session or regarding the user, and so forth. The maintained record of interactions optionally includes interactions the user has with multiple different online sessions.

During an online session, the user may become disengaged from the online session, which refers to the user not paying attention to the online session. This can occur for various reasons, such as the user losing interest in the information being presented, the user becoming sidetracked due to other programs running on his or her computer or phone, and so forth. The techniques discussed herein detect that a user is not engaged in the online session and generate dynamic content to attempt to re-engage the user in the online session. This dynamic content is personalized to the user, and is based on the maintained record of user interactions with the online session (and optionally additional online sessions).

By way of example, the user can be detected as not engaged in the online session based on information from an end-user program providing the online session at the user's device and/or an operating system running on the user's device. This detection can be performed in various manners based on the information, such as detecting that the user is not engaged in the online session if the user is not interacting with the online session, if the end-user program providing the online session at the user's device is minimized, if the user is detected as not being present at the computing device, if the volume level of the user's device is muted or set below a threshold volume level, and so forth.

In response to detecting that the user is not engaged in the online session, the record of user interactions with one or more online sessions is analyzed to identify dynamic content for the user. The dynamic content can be generated by applying various different rules, criteria, or algorithms to the record of interactions for the user. These rules, criteria, or algorithms can identify that another user with which the disengaged user previously interacted is currently speaking or sharing information in the online session and generate dynamic content indicating that the other user is currently speaking or sharing information, can determine that another user that answered questions similarly or answered similar questions is currently speaking or sharing information in the online session and generate dynamic content indicating that the other user is currently speaking or sharing information, and so forth. The dynamic content is displayed or otherwise presented (e.g., played back audibly) while the user is disengaged in an attempt to reengage the user in the online session.

For example, another user that is currently presenting information in the online session and that the disengaged user has previously chatted with or answered poll questions similarly as can be identified and the dynamic content can be an indication displayed that the other user is presenting information that might be of interest (e.g., "Ajay is currently saying something that might interest you."). The personalization can thus go beyond simply identifying the user by name or other logon identifier, and attempts to re-engage the user based on his or her previous interaction with the online session and optionally his or her previous interaction with one or more additional online sessions.

Figure 1:
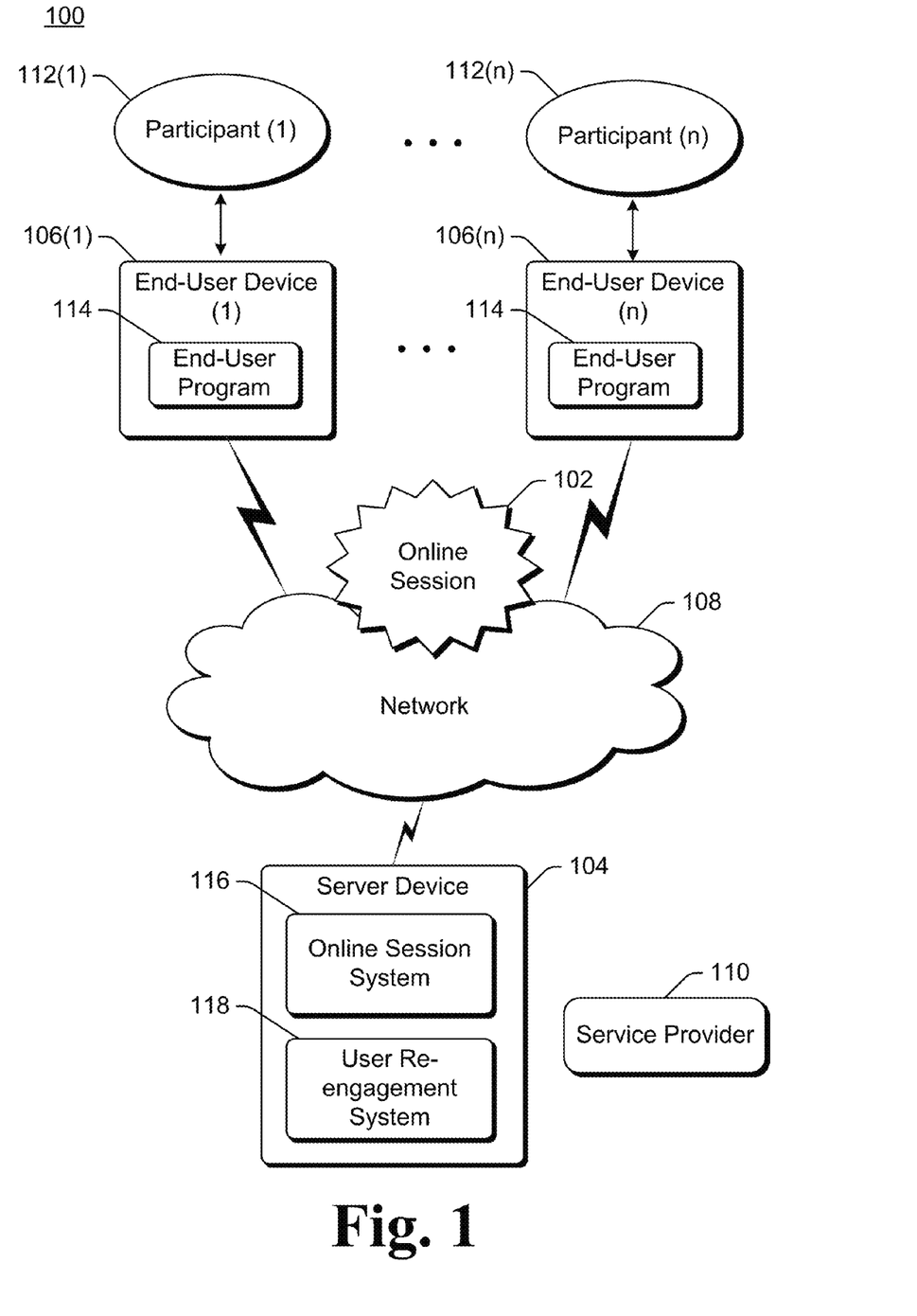
FIG. 1 illustrates an example environment that is operable to employ the techniques described herein that relate to an online session.

FIG. 1 illustrates an example environment 100 that is operable to employ the techniques described herein that relate to an online session 102. As illustrated, in addition to the online session 102, the environment 100 includes at least one server device 104, one or more end-user devices 106, at least one network 108, at least one service provider 110, and one or more participants 112 (also referred to as users). More specifically, "n" end-user devices 106(1) . . . 106(n) and "n" participants 112(1) . . . 112(n) are shown, with "n" representing an integer greater than one. Each end-user device 106 includes at least one end-user program 114. The server device 104 includes an online session system 116 and a user re-engagement system 118.

In one or more embodiments, the participants 112(1) . . . 112(n) are to participate in the online session 102 via at least one network 108 with the online session system 116 to provide at least one resource to support conducting the online session 102. The online session 102 may, for example, be offered or at least facilitated by the service provider 110 (e.g., Cisco WebEx®, GoToMeeting®, Google+Hangouts®, Microsoft Lync®, Adobe Connect®, etc.). The service provider 110 may be associated with (e.g., own, lease, manage, etc.) the server device 104 and cause to be executed the online session system 116 and the user re-engagement system 118. The server device 104 may comprise, for example, a web server, a telecommunications bridge, a telecommunications switch, a voice-over-IP (VoIP) server, a server running open source software, a server of a proprietary design, a stand-alone server, a server blade, an allocated portion of a server farm, distributed server functionality, some combination thereof, and so forth. Although a single server device 104 is explicitly shown in FIG. 1, the server device 104 may be representative of a plurality of different devices that interoperate or coordinate to perform operations "over the cloud" or "in the cloud" as is known.

The server device 104 may be configured to facilitate the online session 102 as a so-called cloud service for example, over the network 108. The network 108 may comprise at least a portion of one or more network types, such as a public network, a private network, the Internet, the web, an Ethernet, an intranet, a Wi-Fi network, a wireless network, a wired network, an LTE network, a PSTN, a cellular network, or some combination thereof. Via the network 108, the server device 104 can communicate with the end-user devices 106 during an online session 102.

During an online session 102, a respective participant 112 of participants 112(1) . . . 112(n) may participate in the online session 102 using at least one respective end-user device 106 of end-user devices 106(1) . . . 106(n). An end-user device 106 may comprise or may be configured as any suitable type of computing device. Examples of end-user devices 106 include, but are not limited to, a desktop computer, a laptop computer, a mobile device (e.g., assuming a handheld configuration such as a tablet, a mobile phone, a phablet, etc.), an entertainment appliance such as a smart television, a game console, a device configured to receive gesture input, a device configured to receive speech or video input, a device configured to provide 2D or 3D image output, a device configured to provide sound output, a wearable computing device such as a smart watch or intelligent glasses, an office phone, a cordless phone, or some combination thereof. Thus, an end-user device 106 may range from relatively high-resource devices with substantial memory and processor resources (e.g., personal computers or game consoles) to relatively low-resource devices with constrained memory or processing resources (e.g., mobile devices such as wearables). Additionally, although a single respective end-user device 106 is explicitly shown per participant 112 in FIG. 1, each participant 112 may alternatively use multiple end-user devices 106 to participate in a given online session 102 (e.g., a participant may dial in with a telephonic device and log in with a web browser of a laptop device, or a participant may experience presented content via a projected image from intelligent glasses and via sound emanating from an earpiece of the intelligent glasses while contributing audio or video from time to time with a smart watch).

An end-user device 106 includes an end-user program 114 that enables user participation in an online session 102. The end-user program 114 may include functionality to access web-based resources (e.g., online session services or content of an online session), to browse the Internet, to access web links embedded in an email or other electronic message, to interact with service providers, to contribute content to an online session, to dial into a teleconference bridge, to receive content for an online session, to process received content, to present processed content locally, some combination thereof, and so forth. Examples of end-user programs 114 may include, but are not limited to, a web browser, a browser plug-in, a dedicated online session application, HTML5 code, a web application, telephone code in a traditional or feature or smart phone, communication features of an operating system, or some combination thereof. Although a single end-user program 114 is explicitly shown for each end-user device 114 in FIG. 1, multiple end-user programs 114 may be working independently or in concert as part of one end-user device 106 or across multiple end-user devices 106 during an online session 102.

As noted above, for the environment 100, a service provider 110 may be associated with the server device 104 or with the online session system 116 to provide a service for facilitating online sessions 102 over the network 108. This example scenario may be considered a "cloud-based" computing environment. Generally, a service provider 110 may be configured to make various online sessions resources available over the network 108 to the participants 112, one of which hosts an online session 102. In some scenarios, an end-user that wishes to host one or more online sessions 102 may sign up for an account that enables access to online sessions resources from a service provider 110. A service provider 110 may authenticate credentials of a host (e.g., username and password of the host) before granting access to an account and associated online sessions resources. Non-host participants may be provided access to one or more online sessions resources with some level of authentication, without authentication, on a one-time-use code basis, responsive to receipt of a participant-specific or session-specific password, some combination thereof, and so forth. Online session resources may include, for example, ability to host or join an online session, ability to send invites to an online sessions, ability to control an online session, ability to contribute content, ability to receive presented content, ability to store a copy of an online session, ability to retrieve or observe a stored version of an online session, ability to customize reproduction of an online session as described herein, or some combination thereof.

Also as noted above, the server device 104 also includes the user re-engagement system 118. The user re-engagement system 118 maintains a record of interactions that each participant 112 has with one or more online sessions (including the online session 102), and also detects situations in which the a participant 112 has become disengaged from the online session 102. In response to detecting that a particular participant has become disengaged from the online session 102, the user re-engagement system 118 generates, based on the record of interactions the participant has had with one or more online sessions, dynamic content personalized to that participant. This dynamic personalized content can then be displayed or otherwise presented to the disengaged participant at the end-user device 106 being used by the disengaged participant. Although the user re-engagement system 118 is illustrated as being part of the server device 104, all or part of the user re-engagement system 118 can be implemented on the end-user devices 106.

Figure 2:
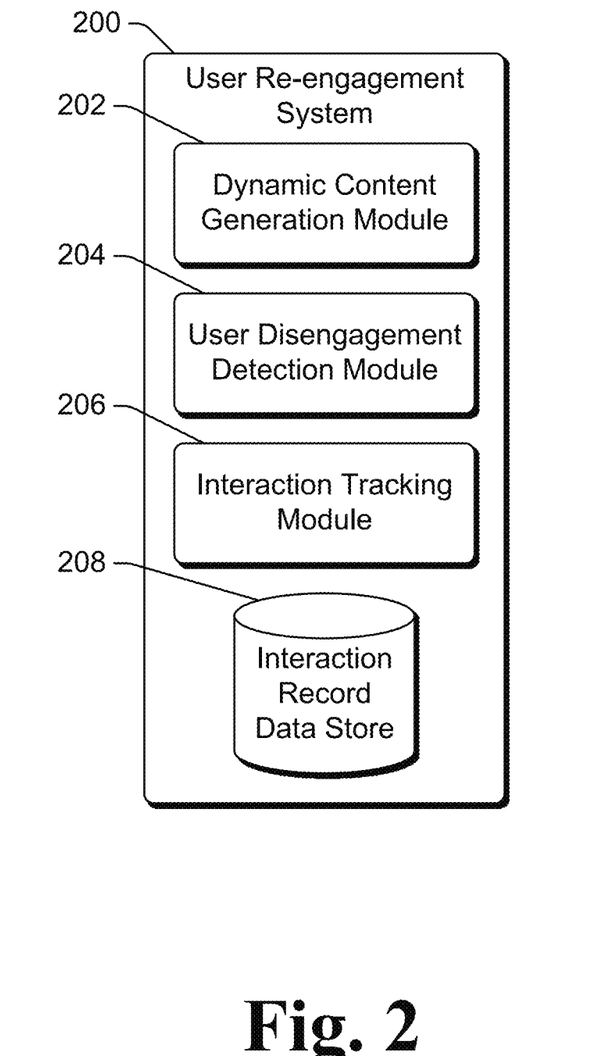
FIG. 2 illustrates an example user re-engagement system in accordance with one or more embodiments.

FIG. 2 illustrates an example user re-engagement system 200 in accordance with one or more embodiments. The user re-engagement system 200 can be, for example, the user re-engagement system 118 of FIG. 1. The user re-engagement system 200 can be implemented across one or more computing devices, such as one or more server devices 104 of FIG. 1, a combination of server device 104 and end-user device 106 of FIG. 1, and so forth.

The user re-engagement system 200 includes a dynamic content generation module 202, a user disengagement detection module 204, an interaction tracking module 206, and an interaction record data store 208. Different combinations of the modules 202-206 and the data store 208 can be implemented on the same or different computing devices, or individual ones of the modules 202-206 and the data store 208 can be implemented on the same or different computing devices. For example, the interaction record data store 208 can be implemented across multiple devices (e.g., a server device 104 and an end-user device 106 of FIG. 1). Although particular functionality is discussed herein with reference to particular modules, it should be noted that the functionality of individual modules discussed herein can be separated into multiple modules, and/or at least some functionality of multiple modules can be combined into a single module.

The interaction tracking module 206 monitors users' interactions with online sessions, and stores a record of those interactions in the interaction record data store 208. The interaction record data store 208 can maintain the records of users' interactions with online sessions using lists, tables, databases, or any of a variety of other data structures. The interaction record data store 208 can be implemented using any of a variety of different types of storage devices, such as random access memory (RAM), Flash memory, digital disks, optical discs, and so forth. Different users can be identified by the interaction tracking module 206 in different manners, such as based on a login name or identifier used to log into the online session, phone numbers from which the users called to access the online session, and so forth. This identification of different users allows interactions for different users to be tracked, as well as identification of which other users a particular user interacts with.

The interaction tracking module 206 can record any of a variety of different data regarding users' interactions with an online session. Different types of interactions with an online session, as well as data that may be recorded for an interaction, are discussed herein. It should be noted that these discussed types of interactions and data recorded for interactions are examples and that additional types of interactions and/or data for interactions can additionally or alternatively be recorded.

In one or more embodiments, the type of interaction is the user speaking as part of the online session. The data recorded for the user speaking can include a current subject matter of the online session, such as a current subject or topic of the online session according to a table of contents for the online session, a current subject or topic of the online session according to a list of talking points or agenda for the online session, and so forth. The data recorded for the user speaking can also include keywords or content identified from the user's input (e.g., whatever words were spoken by the user). The data recorded for the user speaking can also include identifiers of any other users that were speaking at approximately the same time as the user (e.g., other users speaking within a threshold amount of time, such as 30 seconds, of the user speaking).

In one or more embodiments, the type of interaction is the user sharing information as part of the online session, such as images, slides, documents, or other data. The data recorded for the user sharing information can include a current subject matter of the online session, such as a current subject or topic of the online session according to a table of contents for the online session, a current subject or topic of the online session according to a list of talking points or agenda for the online session, and so forth. The data recorded for the user sharing information can also include keywords or content identified from the data that the user shared. The data recorded for the user sharing information can also include identifiers of any other users that were speaking and/or sharing information at approximately the same time as the user (e.g., other users speaking within a threshold amount of time, such as 30 seconds, of the user sharing information).

In one or more embodiments, the type of interaction is the user communicating with one or more other users via a supplemental communication channel. The supplemental communication channel refers to a communication channel that is separate from the primary communication channel for the online session. The primary communication channel refers to the communication channel via which the online session is being presented, and the supplemental communication channel refers to a communication channel other than the primary communication channel. For example, the primary communication channel can be a combination of audio, voice, and data (e.g., slide or video) presentation, and the supplemental communication channel can be a chat or email communication channel. The supplemental communication channel may be viewable to all participants in the online session, or only a subset of participants in the online session. For example, a user may participate in a chat session with one or more other, but less than all, of the participants in the online session. The data recorded for the user communicating with other users can include various data regarding the communication, such as an identification of the other users being communicated with, a length or duration of the communication, a frequency of communication with other users or communication count (e.g., a number of chat communications), and so forth.

In one or more embodiments, the type of interaction is the user answering questions provided as part of the online session. These questions can take various forms, such as quizzes, polls, and so forth presented to the user. These questions are typically made available to multiple participants (e.g., all participants) in the online session, and a record of the answers to these questions can be maintained. The data recorded for the user answering questions can include the subject matter of the questions (e.g., different polls or quizzes can cover different subject matter, and data regarding the subject matter of the polls or quizzes that the user answered can be recorded), the user's answers to the questions, and so forth.

In one or more embodiments, the type of interaction is the user asking questions as part of the online session. The data recorded for the user speaking can include a current subject matter of the online session at the time the question is asked, such as a current subject or topic of the online session according to a table of contents for the online session, a current subject or topic of the online session according to a list of talking points or agenda for the online session, and so forth. The data recorded for the user asking questions can also include keywords or content identified from the user's input (e.g., whatever words were included in the question).

The interaction tracking module 206 can record data for a single online session or multiple online sessions. For example, a record of the user's interaction with a particular online session can be maintained and used to generated dynamic content personalized to the user as discussed in more detail below. By way of another example, a record of the user's interaction with multiple different online sessions (spread out over days, weeks, months, etc.) can be maintained and used to generate dynamic content personalized to the user as discussed in more detail below.

The user disengagement detection module 204 monitors the user at the end-user device (e.g., an end-user device 106 of FIG. 1) and determines when the user is not engaged in (has become disengaged from) the online session. The user disengagement detection module 204 can determine whether the user is not engaged in the online session based on information from various sources, such as an end-user program providing the online session at the user's device (e.g., an end-user program 114 of FIG. 1), an operating system running on the user's device, combinations thereof, and so forth. Various different rules or criteria can be applied to the information received from one or more of these sources to determine whether the user is not engaged in the online session.

In one or more embodiments, the user disengagement detection module 204 monitors the user's interaction with the end-user program providing the online session at the user's device to determine whether the user is not engaged in the online session. This monitoring can include monitoring various aspects of the user's interaction, such as whether the user is interacting with the online session. For example, the monitoring can include determining whether the user is speaking, engaging in supplemental communications (e.g., sending chat messages to one or more other users), responding to polls or quizzes, providing a thumbs-up, high-five, or similar indication indicating the user likes or agrees with (or alternatively dislikes or disagrees with) the current subject matter of the online session, and so forth. The user disengagement detection module 204 can determine that the user is engaged if the user has interacted with the online session within a threshold amount of time prior to the current time (e.g., within the last 3 minutes), that the user has interacted with the online session at at least a threshold frequency (e.g., at least once every 5 minutes over the past 30 minutes), and so forth.

Data regarding the timing of when a user answers a question, asks a question, chats with another user, or otherwise interacts with the online session can also be recorded in the interaction record data store 208 by the interaction tracking module 206. From this timing data the user disengagement detection module 204 can readily determine a frequency with which the user typically performs some interaction (e.g., answers a question, asks a question, chats with another user, etc.), and determine that the user is not engaged in the online session if the user has not performed a particular interaction within a threshold amount of time (e.g., 30 seconds, 120% of the typical interval between interactions, etc.).

In one or more embodiments, the user disengagement detection module 204 receives notifications from an operating system running on the user's device and uses these notifications to determine whether the user is not engaged in the online session. These notifications can be provided using various communications systems such as messages, events, and so forth. These notifications can include, for example, notifications of whether the end-user program providing the online session at the user's device is the topmost application on the computing device (e.g., is displayed in the topmost of multiple windows displayed in the user interface of the computing device), whether the end-user program providing the online session at the user's device has been maximized or minimized (e.g., is displayed in a window of multiple windows displayed in the user interface of the computing device that has been maximized or minimized), whether a user is detected as being present at the computing device (e.g., based on images captured by a camera at the computing device, user input via a mouse, keyboard, or other input device), a volume level setting on the user's device, whether new program processes are opened or otherwise created on the user's device, and so forth.

The user disengagement detection module 204 can use this data to determine whether the user is engaged or disengaged from the online session in a variety of different manners. For example, the user disengagement detection module 204 can determine that the user is engaged if the end-user program providing the online session at the user's device is the topmost application on the computing device or is maximized. By way of another example, the user disengagement detection module 204 can determine that the user is not engaged if the end-user program providing the online session at the user's device is minimized, or the user is detected as not being present at the computing device. By way of yet another example, the user disengagement detection module 204 can also determine that the user is disengaged from the online session if the volume level of the user's device is muted or set below a threshold volume level. By way of still another example, the dynamic content generation module can determine that the user is disengaged from the online session if a new process of a particular type of program (e.g., a process of a user mode program, a process of a game application, a process of an email or other communication program, etc.) has begun running and continues to run for a threshold amount of time (e.g., at least fifteen seconds).

It should be noted that the user disengagement detection module 204 determines that a user is either engaged in the online session or disengaged from the online session. A user that is engaged in the online session is not disengaged from the online session, and a user that is disengaged from the online session is not engaged in the online session.

The dynamic content generation module 202 generates, in response to the user disengagement detection module 204 determining that the user is not engaged in the online session, dynamic content that is personalized to the user. The dynamic content is personalized based on the interaction records stored in the interaction record data store 208. Various different rules, criteria, or algorithms can be applied to the interaction records in order to generate the dynamic content.

In one or more embodiments, the dynamic content generation module 202 checks whether, for a disengaged user, another user with which the disengaged user previously interacted (e.g., via chat communications) is currently speaking or sharing information in the online session. If such another user is currently speaking or sharing information in the online session, the dynamic content generation module 202 generates dynamic content indicating to the disengaged user that the other user is currently speaking or sharing information in the online session.

Additionally or alternatively, the dynamic content generation module 202 checks whether, for a disengaged user, another user that answered questions similarly or answered similar questions is currently speaking or sharing information in the online session. Two users can have answered questions similarly, for example, if the two users provided the same or substantially the same manner (e.g., provided the same answers, provided at least a threshold percentage (e.g., 75%) of the same answers, answered questions on the same subject matter, answered at least a threshold number (e.g., 5) of questions on the same subject matter, and so forth). If such another user is currently speaking or sharing information in the online session, the dynamic content generation module 202 generates dynamic content indicating to the disengaged user that the other user is currently speaking or sharing information in the online session.

Additionally or alternatively, the dynamic content generation module 202 can maintain a record (e.g., in the data store 208 or elsewhere) of user behaviors that led to the user being detected as disengaged, and the associated dynamic content, which is the dynamic content that was generated for a particular user behavior. The dynamic content generation module 202 compares the current behavior that has led to the user being detected as disengaged to the record of user behaviors, and if the behaviors match (e.g., are the same or similar), the dynamic content generation module 202 obtains the dynamic content in the record associated with the matching user behavior. The record of user behaviors and associated dynamic content can be associated with particular online sessions (e.g., by online session identifiers), so the recorded user behaviors and associated dynamic content can be accessed for subsequent instances of the same online session (e.g., different presentations of the same webinar). The obtained dynamic content can be displayed or otherwise presented to the user, or can be used as a basis for generation of the dynamic content. Thus, even though the dynamic content is previously stored content, the content is still dynamic in that it is determined based on the current user behavior.

The dynamic content generation module 202 can additionally or alternatively be generated in any of a variety of other manners. Regardless of the specific manner in which the dynamic content generation module 202 is implemented, the dynamic content generation module 202 leverages the data regarding the user interactions with the online session that are recorded in the data store 208, and generates content that is personalized to the user and is expected to be meaningful to the user. Rather than simply identifying the user by name or id, or providing some generic message telling the user to pay attention to the online session, the content generated by the dynamic content generation module 202 is expected to be meaningful and personal to the user.

The dynamic content generated by the dynamic content generation module 202 is presented (e.g., displayed) in an attempt to re-engage the disengaged user. The dynamic content can be presented by the dynamic content generation module 202, or alternatively the dynamic content can be provided to another module (on the same device as the dynamic content generation module 202 or a different device) which presents the dynamic content. It should be noted that the dynamic content is personalized to the disengaged user, and is presented for that disengaged user rather than other users. The dynamic content is not presented to all participants of the online session. If multiple users of the online session are disengaged from the online session at the same time, different dynamic content is generated for each of the multiple users, each different dynamic content being personalized to a particular one of the multiple users.

In one or more embodiments, the dynamic content generation module 202 also maintains a record of dynamic content that has been generated for a user, and whether presentation of the previously generated dynamic content was successful in re-engaging the user in the online session. This record of dynamic content can be maintained along with the record of interactions in the data store 208, or alternatively in another data store. Whether presentation of dynamic content was successful in re-engaging the user in the online session can be determined in different manners, such as whether the user is determined by the user disengagement detection module 204 to be engaged in the online session within a threshold amount of time (e.g., 20 seconds) of the dynamic content being presented.

The record of whether presentation of previously generated dynamic content was successful in re-engaging the user in the online session is optionally used by the dynamic content generation module 202 in generating subsequent dynamic content. This record of dynamic content can be used in various manners in generating subsequent dynamic content. For example, a particular type of presentation (e.g., visual or audio) may be determined to be more successful in re-engaging the user and thus used by the dynamic content generation module 202 for generating subsequent dynamic content. By way of another example, particular data in the dynamic content (e.g., references to particular subject matter, references to particular users, etc.) may be determined to be more successful in re-engaging the user and thus used by the dynamic content generation module 202 when appropriate for generating subsequent dynamic content. Thus, the dynamic content generation module 202 can learn what types of dynamic content are more likely to be successful in re-engaging a user, and can do so for each of multiple users of the online session.

Figure 3:
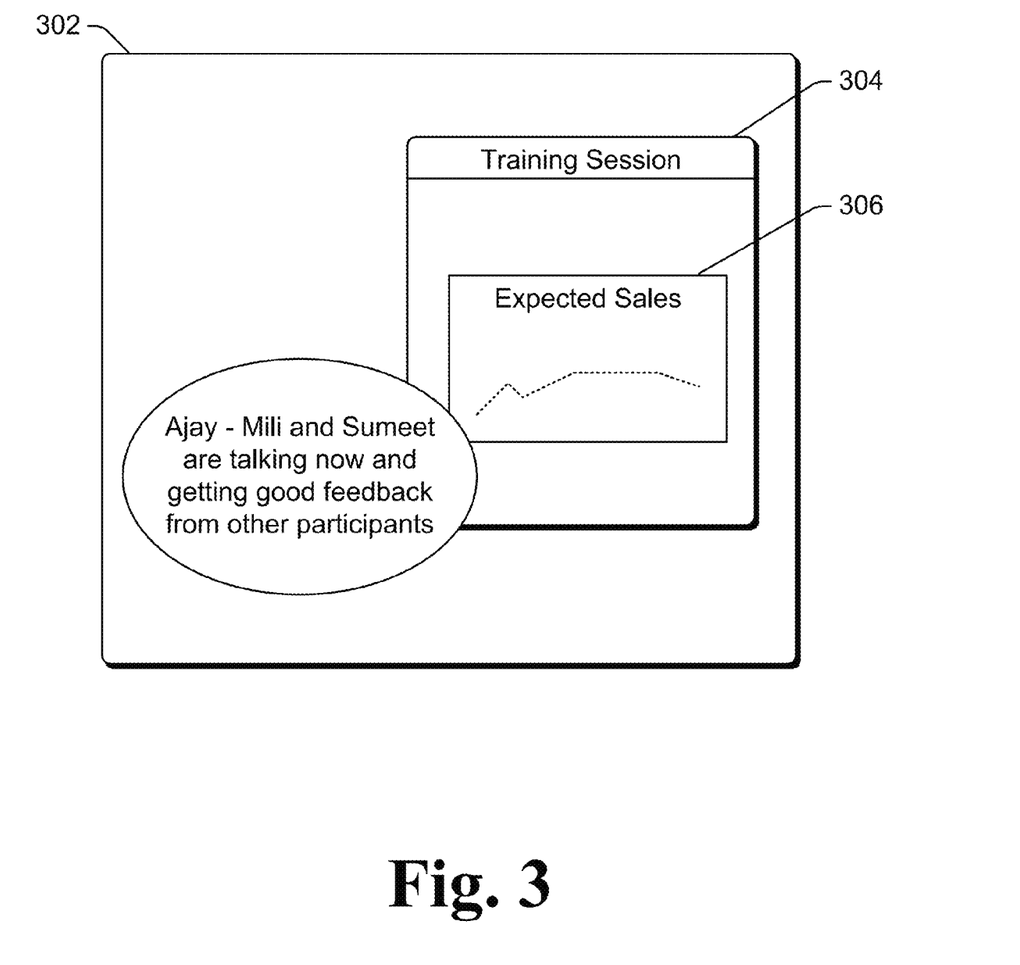
FIG. 3 illustrates an example user interface in which dynamic content is displayed in accordance with one or more embodiments.

FIG. 3 illustrates an example user interface in which dynamic content is displayed in accordance with one or more embodiments. The user interface includes a screen 302 on which is displayed a window 304 including a presentation of an online session that is a training session. In the example of FIG. 3, a slide 306 showing a graph of expected sales of a product or service is currently being displayed. In the example of FIG. 3, it is assumed that the user disengagement detection module 204 of FIG. 2 has determined that the user of an end-user device is not engaged in the online session. The disengaged user's name (e.g., the user name used to log into the online session or otherwise associated with the user) is "Ajay", and it is further assumed that the dynamic content generation module 202 of FIG. 2 has determined that the disengaged user has previously interacted with (or answered questions similarly or a answered similar questions as) two other users "Mili" and "Sumeet", and that these two other users are currently speaking and receiving positive feedback from other participants in the online session. Accordingly, the dynamic content generation module 202 generates dynamic content in the form of text 308 that is displayed on the screen 302. In the illustrated example of FIG. 3, this text 308 reads "Ajay— Mili and Sumeet are talking now and getting good feedback from other participants". By generating dynamic content that is personalized to the disengaged user, referring back to other users that the disengaged user has previously interacted with (or answered questions similarly or similar questions) in the illustrated example, it is anticipated that the likelihood of re-engaging the disengaged user in the online session is increased.

Figure 4:
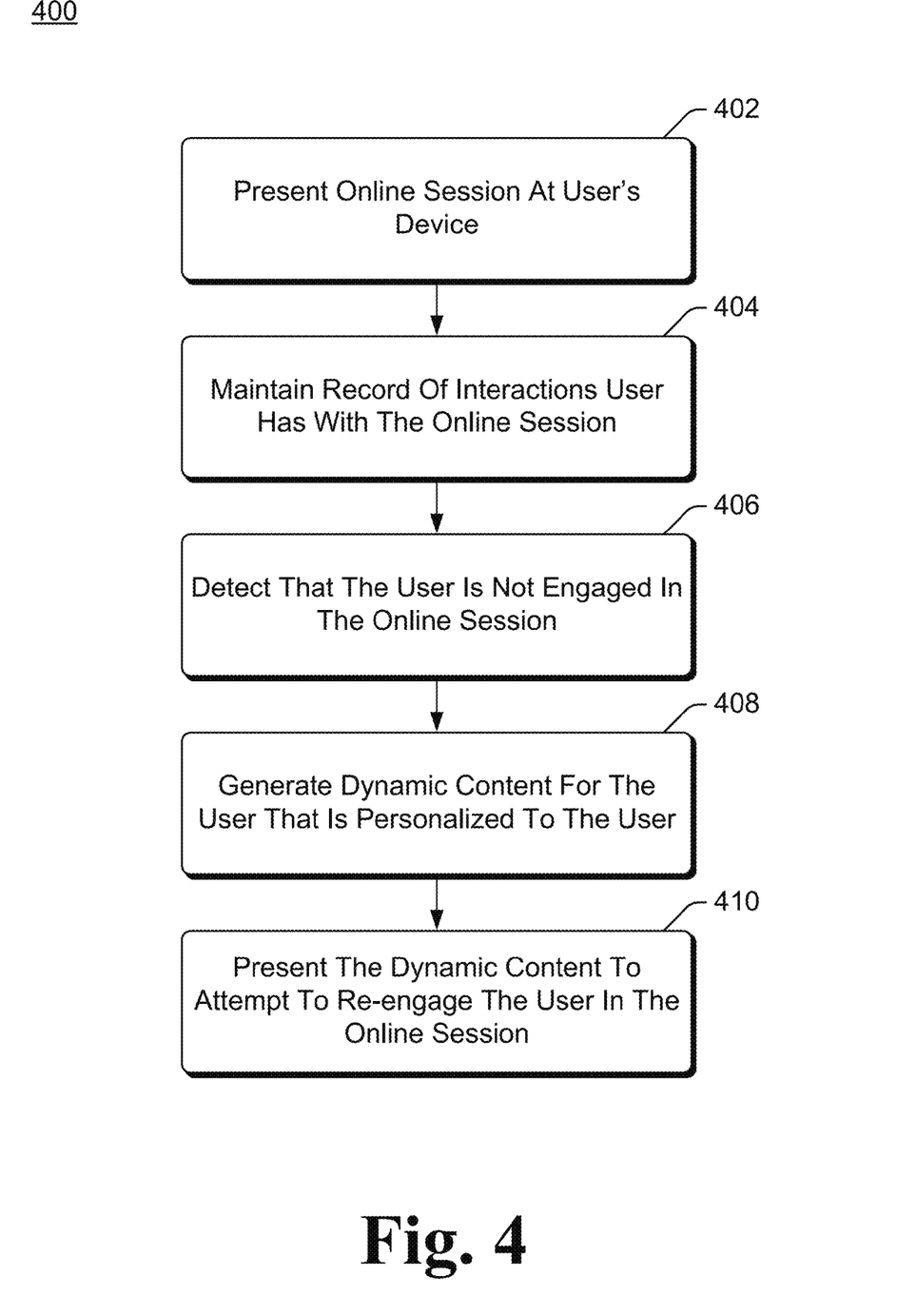
FIG. 4 is a flowchart illustrating an example process for implementing the dynamic personalized content presentation to re-engage users during online sessions in accordance with one or more embodiments.

FIG. 4 is a flowchart illustrating an example process 400 for implementing the dynamic personalized content presentation to re-engage users during online sessions in accordance with one or more embodiments. The process 400 is carried out by a system, such as the user re-engagement system 200 of FIG. 2, and can be implemented in software, firmware, hardware, or combinations thereof. The process 400 can be implemented by a single device or across multiple devices. The process 400 is shown as a set of acts and is not limited to the order shown for performing the operations of the various acts. The process 400 is an example process for implementing the dynamic personalized content presentation to re-engage users during online sessions; additional discussions of implementing the dynamic personalized content presentation to re-engage users during online sessions are included herein with reference to different figures.

In process 400, an online session is presented at a user's device (act 402). The online session can be presented in a variety of different manners, such as displaying information (e.g., slides, images, videos, etc.), playing back audio information (e.g., a presenter's voice), and so forth.

A record of interactions the user has with the online session is maintained (act 404). Various data for various different types of interactions can be recorded as discussed above. For example, data for the user speaking as part of the online session can be recorded, data for the user sharing information as part of the online session can be recorded, data regarding user communications with other users can be recorded, data regarding the user answering questions as part of the online session can be recorded, and so forth as discussed above.

The user not being engaged in the online session is detected (act 406). This detection can be performed in various manners based on information from various sources as discussed above, such as information from an end-user program providing the online session at the user's device, information from an operating system running on the user's device, combinations thereof, and so forth.

Dynamic content for the disengaged user is generated (act 408). This dynamic content is personalized to the disengaged user, and is generated based on the maintained record of interactions that the user has with the online session.

The dynamic content is presented to attempt to re-engage the user in the online session (act 410). The dynamic content can be presented in different manners, such as displayed, played back audibly, and so forth. When to cease presentation of the dynamic content can be determined in different manners. For example, presentation of the dynamic content can continue until a particular amount of time (e.g., 30 seconds) elapses, presentation of the dynamic content can continue until the user is determined to be engaged in the online session (e.g., by the user disengagement detection module 204 of FIG. 2), and so forth.

The techniques discussed herein support a variety of different usage scenarios. The techniques discussed herein can increase the engagement of users in online sessions, providing a more engaging and personalized experience to the users. This can result in an increase in overall viewership and other participation in online sessions, increasing the value provided by the online session provider as well as increasing the value obtained by the users from the online session.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
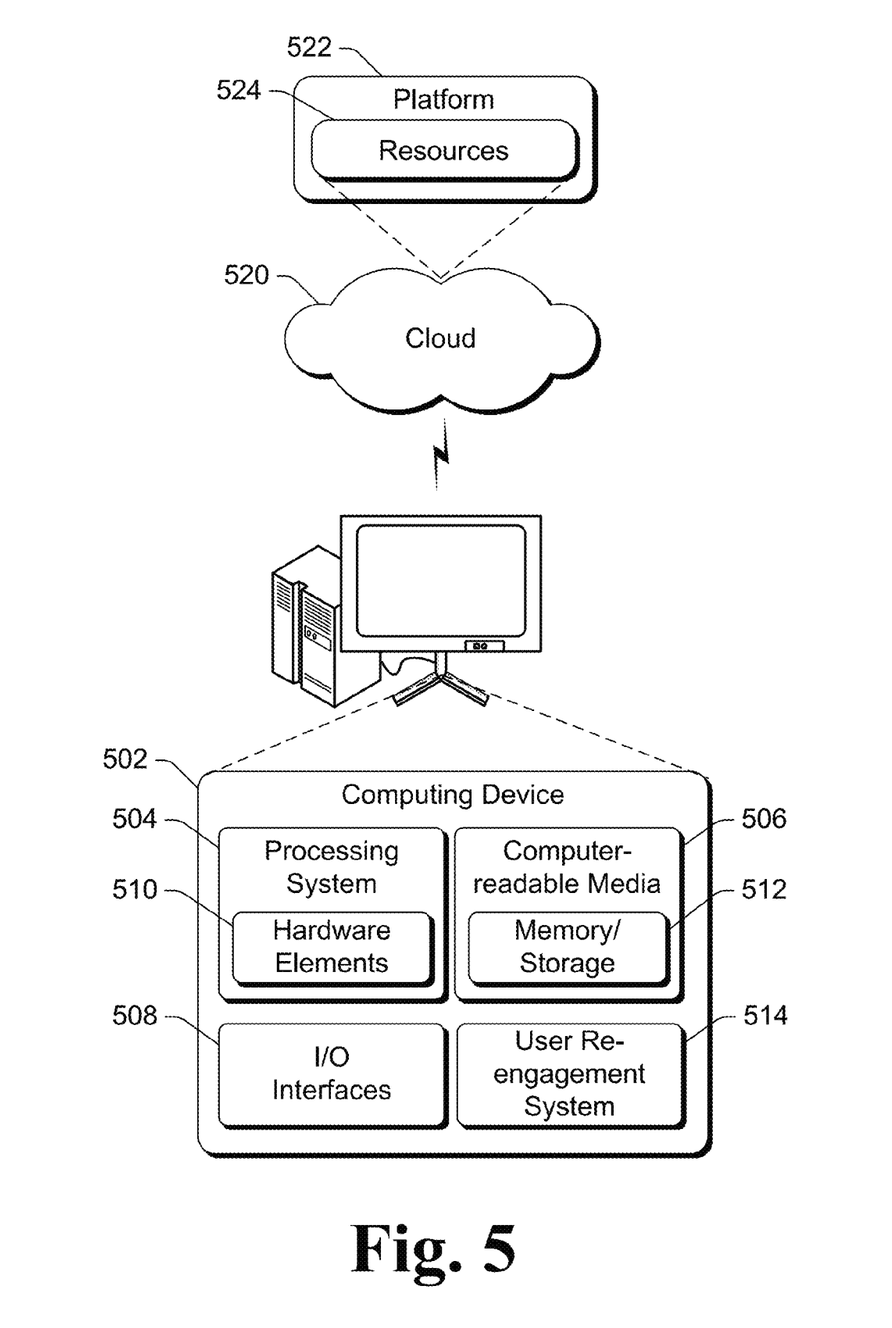
FIG. 5 illustrates an example system that includes an example computing device that is representative of one or more computing systems and/or devices that may implement the various techniques described herein.

FIG. 5 illustrates an example system generally at 500 that includes an example computing device 502 that is representative of one or more computing systems and/or devices that may implement the various techniques described herein. This is illustrated through inclusion of the user re-engagement system 514, which can be the user re-engagement system 118 of FIG. 1 or the user re-engagement system 200 of FIG. 2. Computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 504 is representative of functionality to perform one or more operations using hardware. Accordingly, processing system 504 is illustrated as including hardware elements 510 that may be configured as processors, functional blocks, and so forth. This may include implementation in hardware as an application specific integrated circuit or other logic device formed using one or more semiconductors. Hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 506 is illustrated as including memory/storage 512. Memory/storage 512 represents memory/storage capacity associated with one or more computer-readable media. Memory/storage component 512 may include volatile media (such as random access memory (RAM)) and/or nonvolatile media (such as read only memory (ROM), Flash memory, optical disks, magnetic disks, and so forth). Memory/storage component 512 may include fixed media (e.g., RAM, ROM, a fixed hard drive, and so on) as well as removable media (e.g., Flash memory, a removable hard drive, an optical disc, and so forth). Computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 502. By way of example, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. Computing device 502 may be configured to implement particular instructions and/or functions corresponding to the software and/or hardware modules. Accordingly, implementation of a module that is executable by computing device 502 as software may be achieved at least partially in hardware, e.g., through use of computer-readable storage media and/or hardware elements 510 of processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of computing device 502 and are not limited to the specific examples of the techniques described herein. This functionality may also be implemented all or in part through use of a distributed system, such as over a "cloud" 520 via a platform 522 as described below.

Cloud 520 includes and/or is representative of a platform 522 for resources 524. Platform 522 abstracts underlying functionality of hardware (e.g., servers) and software resources of cloud 520. Resources 524 may include applications and/or data that can be utilized while computer processing is executed on servers that are remote from computing device 502. Resources 524 can also include services provided over the Internet and/or through a subscriber network, such as a cellular or Wi-Fi network.

Platform 522 may abstract resources and functions to connect computing device 502 with other computing devices. Platform 522 may also serve to abstract scaling of resources to provide a corresponding level of scale to encountered demand for resources 524 that are implemented via platform 522. Accordingly, in an interconnected device embodiment, implementation of functionality described herein may be distributed throughout system 500. For example, the functionality may be implemented in part on computing device 502 as well as via platform 522 that abstracts the functionality of the cloud 520.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
presenting an online session at a computing device of a user, the online session comprising a presentation in which multiple people communicate with each other;
detecting, during the online session, that the user is not engaged in the online session;
generating dynamic content to present to the user, the dynamic content being personalized for the user to specify an additional user speaking in the online session, the additional user expected to be meaningful to the user based on a record of one or more interactions the user or the additional user has had with the online session; and
presenting the dynamic content to attempt to re-engage the user in the online session.

2. The method as recited in claim 1, the method further comprising maintaining a record of interactions across multiple online sessions, and the generating comprising generating the dynamic content to present to the user based on the record of interactions across multiple online sessions.

3. The method as recited in claim 1, the one or more interactions including answering of questions provided as part of the online session.

4. The method as recited in claim 1, the one or more interactions including the user or the additional user speaking as part of the online session or sharing information as part of the online session.

5. The method as recited in claim 1, the one or more interactions including the user or the additional user asking questions as part of the online session.

6. The method as recited in claim 1, the one or more interactions including communication between the user and the additional user via a supplemental communication channel that is separate from a primary communication channel.

7. The method as recited in claim 6, the generating dynamic content further comprising
including, in the dynamic content, an indication that the additional user is currently speaking in the online session.

8. The method as recited in claim 1, the detecting that the user is not engaged in the online session comprising detecting that the user is not engaged in the online session based on interaction of the user with an end-user program that provides the online session at the computing device.

9. The method as recited in claim 1, the detecting that the user is not engaged in the online session comprising detecting that the user is not engaged in the online session based on notifications received from an operating system of the computing device.

10. The method as recited in claim 1, the generating dynamic content comprising generating dynamic content that is personalized to the user in a different manner than dynamic content personalized to one or more other users of the online session.

11. A computing device comprising:
one or more processors; and
one or more computer-readable media having stored thereon multiple instructions that, when executed by the one or more processors, cause the one or more processors to perform actions comprising:
maintaining a record of one or more interactions a user has with an online session, the online session comprising a presentation in which multiple people communicate with each other;
determining, in response to the user being detected as not engaged in the online session, dynamic content to present to the user, the dynamic content being personalized for the user to specify an additional user sharing information in the online session, the additional user expected to be meaningful to the user based on the one or more interactions the user or the additional user has had with the online session; and
providing the dynamic content for presentation to attempt to re-engage the user in the online session.

12. The computing device as recited in claim 11, the one or more interactions including the user communicating with the additional user via a supplemental communication channel that is separate from a primary communication channel, the additional user speaking at a same time as the user is detected as not engaged in the online session, and the dynamic content specifying a name of the additional user as well as that the additional user is a current speaker in the online session.

13. The computing device as recited in claim 11, the one or more interactions including the user communicating with the additional user via a supplemental communication channel that is separate from a primary communication channel, the additional user sharing information while the user is detected as not engaged in the online session, and the dynamic content specifying a name of the additional user as well as that the additional user is currently sharing information in the online session.

14. The computing device as recited in claim 11, the one or more interactions including the user or the additional user answering questions provided as part of the online session similarly as the additional user, the additional user sharing information while the user is detected as not engaged in the online session, and the dynamic content specifying that the additional user is currently sharing information in the online session.

15. The computing device as recited in claim 11, the one or more interactions including the user or the additional user answering similar questions provided as part of the online session as the additional user, and the dynamic content specifying that the additional user is currently sharing information in the online session.

16. A system comprising:
at least one computing device configured to perform operations comprising:
detecting, during a webinar, that a user of the at least one computing device is not engaged in the webinar;
generating dynamic content personalized to the user to specify an additional user speaking in the webinar, the additional user expected to be meaningful to the user based on multiple interactions the user or the additional user previously had with the webinar; and presenting the dynamic content to attempt to re-engage the user in the webinar.

17. The system as recited in claim 16, the multiple interactions including communication between the user and the additional user via a supplemental communication channel that is separate from a primary communication channel.

18. The system as recited in claim 17, the generating dynamic content further comprising including, in the dynamic content, an indication that the additional user is currently speaking in the webinar.

19. The system as recited in claim 16, the detecting that the user is not engaged in the webinar comprising detecting that the user is not engaged in the webinar based on interaction of the user with an end-user program that provides the webinar at the at least one computing device.

20. The system as recited in claim 16, the detecting that the user is not engaged in the webinar comprising detecting that the user is not engaged in the webinar based on notifications received from an operating system of the at least one computing device.

\* \* \* \* \*